(12) United States Patent
Udding et al.

(10) Patent No.: US 6,828,379 B2
(45) Date of Patent: Dec. 7, 2004

(54) VINYL ETHERS IN UNSATURATED POLYESTER RESINS, VINYL ESTERS AND VINYL ESTER URETHANES FOR STRUCTURAL APPLICATIONS

(75) Inventors: Jan H. Udding, Zwolle (NL); Agnes E. Wolters, Laag Zuthem (NL)

(73) Assignee: DSM IP Assets B.V., Heerlan (NL)

( * ) Notice: Subject to any disclaimer, the term of this patent is extended or adjusted under 35 U.S.C. 154(b) by 45 days.

(21) Appl. No.: 10/021,295

(22) Filed: Dec. 19, 2001

(65) Prior Publication Data

US 2002/0173593 A1 Nov. 21, 2002

Related U.S. Application Data

(63) Continuation of application No. PCT/NL00/00375, filed on Jun. 2, 2000.

(30) Foreign Application Priority Data

Jun. 23, 1999 (NL) .............................................. 1012418

(51) Int. Cl.$^7$ .......................... C08L 51/06; C08F 265/04
(52) U.S. Cl. .......................... 525/61; 525/64; 525/312; 525/99; 525/118; 525/127; 525/128; 525/437; 525/447; 525/451; 525/455; 525/458
(58) Field of Search .............................. 525/61, 64, 99, 525/118, 127, 128, 451, 455, 458, 312, 437, 447

(56) References Cited

U.S. PATENT DOCUMENTS

| 3,431,319 A | 3/1969 | Baum |
|---|---|---|
| 3,721,722 A | 3/1973 | Baum |
| 3,876,726 A | 4/1975 | Ford, Jr. et al. |
| 4,806,603 A | 2/1989 | Hess et al. |
| 5,470,897 A | 11/1995 | Meixner |
| 5,777,024 A | * 7/1998 | Killilea et al. |
| 6,054,502 A | * 4/2000 | Friedlander et al. .......... 522/96 |
| 6,103,779 A | * 8/2000 | Guzauskas .................. 523/115 |

FOREIGN PATENT DOCUMENTS

| EP | 0438628 | 7/1991 |
|---|---|---|
| EP | 028 841 B2 | 11/1991 |
| EP | 377 927 B1 | 5/1994 |
| EP | 322 808 B1 | 6/1994 |
| EP | 254 186 B2 | 9/1994 |

OTHER PUBLICATIONS

English Abstract of Japanese Application 09059329, ",", Thomas Derwent.
English Abstract of DE3940138, ",", Thomas Derwent.

* cited by examiner

Primary Examiner—James J. Seidleck
Assistant Examiner—Olga Asinovsky
(74) Attorney, Agent, or Firm—Mayer, Brown, Rowe & Maw LLP

(57) ABSTRACT

The invention relates to curable resin compositions based on an unsaturated prepolymer, a vinyl ether monomer that can be cross-linked with it and one or more other monomers for use as structural resins. The resin composition is cured with the aid of a radical-forming system that is unstable in the temperature range of −20° C. to +110° C., and contains an unsaturated prepolymer having an acid number of less than 10 mg of KOH per g and a vinyl ether monomer according to formula (I) or (II):

$$A-CH=CH-O-R \qquad (I)$$

or $$(A-CH=CH-O)_n-R' \qquad (II)$$

with A, R, R' and n having the described meanings. The invention also relates to a process for the preparation of such resin compositions and uses thereof.

21 Claims, No Drawings

VINYL ETHERS IN UNSATURATED POLYESTER RESINS, VINYL ESTERS AND VINYL ESTER URETHANES FOR STRUCTURAL APPLICATIONS

This is a Continuation of International Application No. PCT/NL00/00375 filed Jun. 2, 2000 which designated the U.S.

The invention relates to curable resin compositions based on an unsaturated prepolymer, a vinyl ether monomer that can be cross-linked with it and one or more other monomers. An "unsaturated prepolymer" as intended in the context of this application is understood to be an unsaturated polyester, a vinyl ester or a vinyl ester urethane, as are more specifically defined furtheron in this application. The curable resin compositions according to the invention are particularly suitable for use as structural resins. In the context of this application "structural resins" are understood to be resins that are used for the production of moulded parts and other structural elements with a thickness of at least 1 mm. The invention also relates to a method for the preparation of such curable resin compositions, and uses thereof.

Resin compositions based on an unsaturated prepolymer and a monomer that can be cross-linked with it are known from an article by N. Boulkertous in Kunststoffe 84 (1994), 1597–1599. It has been found that the described resin compositions, in which according to the article a vinyl ester resin is cured at a low temperature, cure too slowly, harden insufficiently (i.e. conversion is incomplete) and often also yield a sticky surface. Such problems are also encountered with other types of unsaturated prepolymers. There is however still a great need for structural resins that cure quickly, harden well and/or yield a dry, non-sticky surface. "Quick curing" is in the context of the present application in particular understood to be quick curing at a low temperature, that is, at a temperature of between −20° C. and +110° C., preferably already at ambient temperature, which will usually be between −15° C. and +35° C.

Another disadvantage of the state-of-the-art resin compositions is incidentally often the presence of substantial quantities of styrene as a reactive monomer. In view of the increasingly stringent environmental requirements imposed by legislation on producers and users of resin compositions, there is a great need for the availability of resin compositions with a reduced styrene content. Similar increasingly stringent requirements are also to be found in the field of the use of (meth)acrylates and the like as monomers. In that context aspects of health care in particular (e.g. skin sensitisation) are of importance.

The aim of the invention, now, is to provide curable resin compositions based on an unsaturated prepolymer, a vinyl ether monomer that can be cross-linked with it and one or more other monomers, which do not present the aforementioned disadvantages.

This aim is surprisingly achieved according to the invention because the vinyl ether monomer in the curable resin compositions is a vinyl ether having a general structure according to formula (I) or (II):

(I)

or

(II)

where
A represents hydrogen or an alkyl group with 1–3 C atoms, and where, if there is more than one A, the individual A groups may be the same or different R either represents an aliphatic group, optionally branched, with 1–20 C atoms, which may also contain a cyclohexyl group and in the carbon chain optionally also one or more O and/or S atoms, which group may be substituted with a functional group chosen from either a hydroxyl group or an amino group, optionally substituted with one or two alkyl groups with 1–3 C atoms, or represents a polyethylene glycol or a polypropylene glycol with an average chain length of between 2 and 10 glycol units, optionally with an aliphatic group with 1–5 C atoms attached to the chain's free hydroxyl group and R' either is a residual group that corresponds to an aliphatic group, optionally branched, with 2–20 C atoms, which may also contain a 1,4-dimethylenecyclohexyl group, or represents a polyethylene glycol or a polypropylene glycol with an average chain length of between 2 and 10 glycol units and n is 1, 2, 3 or 4, and the unsaturated prepolymer has an acid number of less than 10 mg of KOH per g, and where the curing is effected with the aid of a radical-forming system that is unstable in the temperature range from −20° C. to +110° C.

The acid number of the unsaturated prepolymer as intended in this application is the acid number determined according to ISO-2114.

The resin compositions according to the invention are particularly suitable for use as structural resins, they have a short curing time and harden excellently. Thanks to the excellent hardening of the surface, the structural materials obtained with the resin compositions also have a dry surface immediately after production. The vinyl ether monomers moreover differ in a favourable respect from styrene and (meth)acrylates in terms of environmental and health aspects.

It goes without saying that, instead of one vinyl ether monomer according to formula (I) or (II), it is also possible to use mixtures of vinyl ether monomers according to formula (I) and/or (II), and the curable resin compositions obtained with such mixtures are included in the scope of protection of this application.

The resin compositions contain an unsaturated prepolymer, that is, an unsaturated polyester or a vinyl ester or a vinyl ester urethane or mixtures thereof. The prepolymers usually have an average molar weight of at least 250 to at most 5000. Preferably, the average molar weight is in the range of 500 to 3500.

As the unsaturated polyester in the curable resin compositions according to the invention, use can be made of unsaturated polyesters with an acid number of less than 10 mg of KOH per g. Such unsaturated polyesters and their preparation are commonly known. They can be prepared from unsaturated polyesters having a higher acid number through e.g. a reaction with alcohols, glycols, ethylene carbonate, propylene carbonate, epoxy compounds, isocyanates or amines. See e.g. EP-A-0254186. It is also possible to use e.g. dicyclopentadiene-modified unsaturated polyesters. See e.g. G. Pritchard (Ed.), Developments in Reinforced Plastics—1 (1980), Applied Science Publishers Ltd, London, ISBN 0-85334-919-3, pp. 64–67. Preferably, the acid number is from 0 to 5 mg of KOH per g, most preferably in the range of from 0 to 3 mg of KOH per g.

All the known vinyl esters can be used as the vinyl esters (also referred to as epoxy (meth)acrylates in the literature) in the curable resin compositions according to the invention. Ethoxylated bisphenol-A-di(meth)acrylates and (unsaturated) polyesters with terminal (meth)acrylate groups are also classed as vinyl esters. The vinyl esters usually already have an acid number of less than 10 mg of KOH per g. Such vinyl esters and their preparation are commonly known. See e.g. G. Pritchard (mentioned above), pp. 29–58.

All the known vinyl ester urethanes can be used as the vinyl ester urethanes (also referred to as urethane (meth) acrylates in the literature) in the curable resin compositions according to the invention. The vinyl ester urethanes usually also have an acid number of less than 10 mg of KOH per g. Such vinyl ester urethanes and their preparation are commonly known. See e.g. U.S. Pat. No. 3,876,726.

Vinyl ester resins (epoxy (meth)acrylates) and vinyl ester urethane resins (urethane (meth)-acrylates) are usually very suitable for chemically stable applications.

The vinyl ether monomers that are used in the resin compositions according to the invention are vinyl ethers (or mixtures thereof) having the general structure according to formula (I) or (II):

  (I)

  (II)

where A, R, R' and n have the meanings indicated above.

Such vinyl ethers are commercially available. Examples of vinyl ethers that are suitable for use in the resin compositions according to the invention are the following compounds according to formula (I):

3-aminopropyl vinyl ether, t-amyl vinyl ether, butyl vinyl ether, cyclohexanedimethanol monovinyl ether, cyclohexyl vinyl ether, 3-diethylaminopropyl vinyl ether, diethylene glycol monovinyl ether, dodecyl vinyl ether, ethylene glycol butyl vinyl ether, ethylene glycol monovinyl ether, 2-ethylhexyl vinyl ether, ethyl vinyl ether, hexanediol monovinyl ether, hydroxybutyl vinyl ether, methyl vinyl ether, octadecyl vinyl ether, polyethylene glycol-520-methyl vinyl ether, triethylene glycol methyl vinyl ether;

or according to formula (II):

butanediol divinyl ether, cyclohexanedimethanol divinyl ether, diethylene glycol divinyl ether, dipropylene glycol divinyl ether, ethylene glycol divinyl ether, hexanediol divinyl ether, neopentyl glycol divinyl ether, tetraethylene glycol divinyl ether, triethylene glycol divinyl ether, trimethylolpropane trivinyl ether, tripropylene glycol divinyl ether.

In addition to the unsaturated prepolymer and the vinyl ether monomer, the resin compositions according to the invention may also contain one or more of the other monomers commonly used in resin compositions. The most common of such other monomers are styrene and (meth) acrylates. The group of the other monomers usually consists of monomers from the group of compounds that can react with the ethylenic unsaturation of the unsaturated prepolymer. Examples of such other monomers are vinylaromatic compounds, vinyl esters and vinyl nitrites. Examples are vinyl acetate, vinyl propionate, vinyl versatate, α-methylstyrene, p-methylstyrene, vinyl toluene and acrylic or methacrylic (hydroxy)esters of alcohols having 1 to 12 C atoms. It is in the context of the present invention also possible to use such other monomers with more than one unsaturation, for example butanedioldi(meth)acrylate, divinyl benzene, diallylphthalate, triallylcyanurate or the diallyl and triallyl ethers of trimethylolpropane.

The curable resin compositions according to the invention are cured with the aid of a radical-forming system that is unstable in the temperature range from −20° C. to +110° C.

"Radical-forming system" is here understood to be a compound that can act as a radical former, optionally in combination with an accelerator. It is of course also possible to use mixtures of radical-forming compounds and/or accelerators. It is for example possible to use peroxides as the radical former, for example diacyl peroxides, hydroperoxides, percarbonates, peresters and mixtures hereof. The peroxide that is used to cure the curable resin compositions according to the invention may be any peroxide known to a person skilled in the art. Examples are methylethylketone peroxide, diacetyl peroxide, cyclohexanone peroxide, acetylacetone peroxide, dibenzoyl peroxide, di-p-chlorobenzoyl peroxide, di-t-butyl peroxide, cumene hydroperoxide, phthaloyl peroxide, succinyl peroxide, dilauryl peroxide, acetylcyclohexanesulphonyl peroxide, t-butyl perbenzoate or t-butyl peroctanoate, cyclohexane percarbonate and bis-(4-t-butylcyclohexyl) percarbonate, etc.

Suitable accelerators are for example tertiary amines and/or metal salts, which—if they are at all added—can be added to the resin compositions in relatively small amounts, preferably in weight amounts of 0.01 to 2 wt. %. Suitable metal salts are for example cobalt octoate or cobalt naphthenate, vanadium, potassium, calcium, copper, manganese or zirconium carboxylates. Suitable amines are for example aniline derivatives and N,N-bisalkylaryl amines, such as N,N-dimethylaniline, N,N-diethylaniline, N,N-dimethylparatoluidine, N,N-bis(hydroxyalkyl)aryl amine, N,N-bis(β-hydroxyethyl) aniline, N,N-bis(β-hydroxyethyl) toluidine, N,N-bis(β-hydroxypropyl)aniline and N,N-bis(β-hydroxypropyl)toluidine. Accelerators that are also suitable are the polymer amines, for example those obtained in polycondensation of N,N-bis(β-hydroxyethyl) aniline with a dicarboxylic acid.

The resin compositions according to the invention may also contain reinforcing materials and/or fillers. As the reinforcing materials use can be made of for example glass fibres, plastic fibres (Dyneema™, Twaron™, polyester felt, etc.), natural fibres (jute, sisal, flax) and carbon fibres. It is also possible to use other reinforcing materials, for example hollow or solid glass beads, or plate-shaped materials such as mica. Suitable fillers are for example kaolin, calcium carbonate, heavy spar, slate flour, talcum, aluminium trihydrate, cement and sand. Pigments and colourants may optionally also be present in the resin composition. It should be noted that composites containing fillers cannot usually be cured with the aid of e.g. UV radiation, especially if the layer thickness of the moulded parts to be cured is greater than 1 mm.

It is also possible to add thixotropic agents such as colloidal silica, highly reactive silicic acids, bentones and (optionally hydrogenated) oils, such as castor oil, to the resin composition.

A person skilled in the art will be able to easily determine which reinforcing materials and/or fillers must optionally be added to the resin composition according to the invention to obtain an optimum result in the field of application in which the resin composition will be used. The amounts of such reinforcing materials and fillers are not critical.

It should be noted that the patent literature describes various curable resin compositions which, in addition to an unsaturated polyester, also include a vinyl ether monomer, but they are predominantly resin compositions that are cured by means of ultraviolet radiation, and are as such only suitable for applications in which curing takes place in thin layers, for example in coatings. The layer thickness is then usually not more than 0.5 mm. The parts obtained are not suitable for use as structural materials.

JP-A-09059329 for example describes UV-curable compositions containing vinyl ether monomers for use in coatings, adhesives and putties, which contain vinyl ether monomers and preferably hydroxybutyl vinyl ether. It has already been mentioned above that composites containing fillers cannot usually be cured with the aid of e.g. UV radiation, especially if the layer thickness of the moulded parts to be cured is greater than 1 mm.

EP-A-0322808 describes resin compositions that can also be cured by means of radiation, which contain vinyl ether monomers which each contain at least two vinyl units in addition to an unsaturated polyester and which are used in coatings. It is by no means obvious that such resin compositions containing vinyl ethers (as in JP-A-09059329 and EP-A-0322808) can with such surprisingly good results be used to prepare structural materials when a different curing mechanism is used.

U.S. Pat. No. 5,470,897 describes radically curable coating compositions for the coating of wood substrates which may contain, next to unsaturated polyesters containing at least one allyl (i.e. a β,γ-ethylenically unsaturated) ether group, a vinyl ether as a separate component. However, no example of the use of such composition is shown in practice. Moreover, this reference does not teach that the acid number should be lower than 10 as in the present invention.

EP-A-0028841 describes resin compositions that are suitable for the production of mouldings via SMC or BMC techniques. The aim of said patent is to obtain mouldings with an aesthetically appealing surface and with a good dimensional stability (shrink-resistant behaviour). The favourable surface properties aimed at in said patent are obtained by using in formulations containing so-called low-profile additives, in addition to styrene, a (vinyl ether) monomer that does not readily copolymerise with styrene. LPAs are substances that ensure that the resin composition shows no, or virtually no, shrinkage during the curing. As common curing temperatures are mentioned 95° C. to 180° C. EP-A-0028841 mentions methyl, ethyl and butyl vinyl ether as vinyl ether monomers. It should incidentally also be added that unsaturated resins with a high acid number, e.g. higher than 25 mg of KOH per g, are usually used in SMC and BMC applications.

EP-A-0377927 describes curable resin compositions for anaerobic curing to obtain rock bolts, in which specific azole compounds have to be used to accelerate the curing. The very long list of ethylenically unsaturated monomers that can be used in those resin compositions also includes vinyl ethers and it is mentioned that such monomers can also be used mixed with other polymerisable oligomers, e.g. with an unsaturated polyester. This application contains no indications of the actual use of vinyl ethers in such compositions. None of the examples contains a vinyl ether monomer. Moreover, said application in no way shows that such resin compositions could also be used outside the field of rock bolts.

DE-A-3940138 describes, also for use in rock bolts, curable resin compositions based on an unsaturated polyester and a compound that can polymerise with it—completely or partly replacing styrene—most specifically various esters (in which one or more cycloaliphatic residual groups containing unsaturations must be present to obtain a good result). The text of said patent also specifies that the residual group concerned may also be present in a molecule that also contains an allyl or vinyl ether group, but the advantages of the use of such ethers over the use of the aforementioned esters are in no way evident.

The vinyl ether monomer in the curable resin compositions according to the invention is preferably a mono- and/or divinyl ether monomer. The resin compositions then obtained show the best properties in most applications.

More in particular the vinyl ether monomer is chosen from the group comprising butanediol divinyl ether, butyl vinyl ether, cyclohexanedimethanol divinyl ether, cyclohexanedimethanol monovinyl ether, diethylene glycol divinyl ether, ethylene glycol divinyl ether, 2-ethylhexyl divinyl ether, ethyl vinyl ether, hexanediol divinyl ether, hydroxybutyl vinyl ether, methyl vinyl ether, triethylene glycol divinyl ether, triethylene glycol methyl vinyl ether and trimethylolpropane trivinyl ether.

The vinyl ether monomer used in the resin compositions according to the invention is preferably hydroxybutyl vinyl ether or triethylene glycol divinyl ether. The resin compositions thus obtained have particularly favourable properties with respect to both their curing time (and gel time) and their hardening at the surface (evident from particularly dry, non-sticky surfaces after curing).

The unsaturated prepolymer in the curable resin compositions according to the invention is preferably a resin containing (meth)acrylate.

Most preferably the (meth)acrylate-containing resin used as the unsaturated prepolymer is a vinyl ester urethane resin.

The amount of vinyl ether monomer in the curable resin compositions according to the invention is generally 0.5–50 wt. %, relative to the weight of the total resin composition.

Wherever this application refers to the weight of the total resin composition this is each time understood to be the total weight of the resin composition as such, that is, excluding the reinforcing materials and/or fillers employed. The total weight of the resin compositions is hence each time calculated as the total weight of only the components (A) unsaturated prepolymer, (B) vinyl ether monomer, (C) one or more other monomers and (D) radical-forming system.

The amount of vinyl ether monomer will usually be 3–25 wt. %.

More in particular the amount of vinyl ether monomer is 5–20 wt. %, relative to the weight of the total resin compositions. At those vinyl ether monomer contents the resin composition yields the best results in the various applications. At vinyl ether monomer contents of less than 0.5 wt. % the effect of the presence of the vinyl ether monomer will be virtually unnoticeable, while no additional effect on the properties is observed at vinyl ether monomer concentrations above 50 wt. %.

The invention also relates to a process for the preparation of a curable resin composition based on an unsaturated prepolymer, a vinyl ether monomer that can be cross-linked with it and one or more other monomers. In the process according to the present invention the resin composition is prepared by blending (1) an unsaturated prepolymer having an acid number of less than 10 mg of KOH per g, (2) a vinyl ether monomer having a general structure according to formula (I) or (II):

$$A\text{—}CH\text{=}CH\text{—}O\text{—}R \quad (I)$$

$$(A\text{—}CH\text{=}CH\text{—}O)_n\text{-}R' \quad (II)$$

where

A represents hydrogen or an alkyl group with 1–3 C atoms, and where, if there is more than one A, the individual A groups may be the same or different, R either represents an aliphatic group, optionally branched, with 1–20 C atoms, which may also contain a cyclohexyl group and in the carbon chain optionally also one or more O and/or S atoms, which group may be substituted with a functional group chosen from either a hydroxyl group or an amino group, optionally substituted with one or two alkyl groups with 1–3 C atoms, or represents a polyethylene glycol or a polypropylene glycol with an average chain length of 2 to 10 glycol units, optionally with an aliphatic group with 1–5 C atoms attached to the chain's free hydroxyl group, and R' either is a residual group that corresponds to an aliphatic group, optionally branched, with 2–20 C atoms, which may also contain a 1,4-dimethylenecyclohexyl group, or represents a polyethylene glycol or a polypropylene glycol with an average chain length of 2 to 10 glycol units, and n is 1, 2, 3 or 4, (3) one or more other monomers,
(4) together with any fillers and/or additives that may be required, after which the resin composition can be cured by adding a radical-forming system that is unstable in the temperature range from −20° C. to +110° C.

The invention also relates to the use of curable resin compositions according to the invention (or prepared according to the process thereof) for the production of moulded parts or structural materials. The invention may then be used in a wide range of fields of application, for example in roofing, in flooring, in putties, in rock bolts, etc.

The curable resin compositions according to the invention can also be used in so-called open-mould techniques such as hand-lay-up and spray-up, and in reinforced materials to replace concrete elements ("re-bars"), in linings of pipes and the like ("re-lining"), and in techniques like pultrusion, reaction-transfer moulding (RTM), vacuum-injection, etc. For a general description of such resin-processing techniques and applications see e.g. P. K. Malick and S. Newman (eds.), Composite Materials Technology (1990), Hanser Publishers, Munich, Vienna, New York, ISBN 3-446-15684-4. In such techniques curing initiated by UV light is usually not suitable on account of the layer thickness of the moulded parts etc. and on account of the use of fillers and/or other additives.

In particular the resin compositions are very advantageously used in flooring, roofing and rock bolts.

The invention will now be elucidated with reference to a few examples, without however being limited to the compositions presented in the examples.

EXAMPLES 1.1 AND 1.2 (AND COMPARATIVE EXAMPLE 1A)

Addition of vinyl ethers (as indicated in the table for Examples 1.1 and 1.2) to a flexible isophthalic unsaturated polyester with a low reactivity (which already contains 35 wt. % styrene and has been modified through reaction of the acid groups with 2,3-epoxypropylneodecanoate, so that the resin's acid number was about 5 mg of KOH per g), Resin A. The resin composition obtained is excellently suitable for use in roofing and flooring. In the comparative example the amount of vinyl ether was replaced by (the same amount of) additional styrene. The indicated amounts are in parts by weight.

A summary is presented in the following table, the quality of the resin compositions having been assessed on the basis of the determination of the gel times according to DIN 16945.

|  | Comp. Ex.1A | Ex. 1.1 | Ex.1.2 |
|---|---|---|---|
| Resin A | 100 | 100 | 100 |
| Styrene | 5 | — | — |
| Hydroxybutyl vinyl ether | — | 5 | — |
| Triethyleneglycol divinylether | — | — | 5 |
| Dimethyl para-toluidine | 0.3 | 0.3 | 0.3 |
| Lucidol CH-50 (*) | 4.0 | 4.0 | 4.0 |
| Gel time at 23° C. (in relative time [%]; Comp.Ex.A. = 100%) | 100% | 80% | 68% |

(*) Lucidol CH-50 ™ is a product of AKZO Nobel which contains 50% dibenzoylperoxide in dicylclohexylphthalate.

EXAMPLES 2.1, 2.2, 3.1 AND 3.2 (AND COMPARATIVE EXAMPLES 2A, 2B, 3A AND 3B)

Addition of vinyl ethers to Resin B (a vinyl ester urethane resin based on 1 mol dipropylene glycol, 2 mols diphenylmethanediisocyanate (MDI) and 2 mols 2-hydroxypropylmethacrylate, dissolved in a mixture of aceto-acetoxyethylmethacrylate and 1,4-butanedioldimethacrylate; the resin also contains di-isopropoxyparatoluidine as an accelerator and has an acid number of 0 mg of KOH per g). The resin compositions obtained according to the invention are very suitable for use in structural applications.

In the comparative examples either no extra component or extra hydroxypropylmethacrylate was added instead of hydroxybutyl vinyl ether or triethylene glycol divinyl ether. The resin compositions thus obtained are less suitable.

The indicated amounts (for Examples 2.1, 2.2 and Comparative Examples 2A and 2B) are in parts by weight. In a further set of experiments (Examples 3.1, 3.2 and Comparative Examples 3A and 3b) molar amounts of components exchanged were kept the same (calculated as molar amounts of unsaturations). This offers an even better comparison of the properties and effects achieved.

A summary is given in the following table, the quality of the resin compositions having been assessed on the basis of the determination of the gel times or the times associated with the interval from 25° C. to the reaching of the exothermal peak, and the associated temperature level. The gel time was measured according to DIN 16945; at 25° C. in a thermostatted bath, statically and in a defined test tube.

The dryness of the set surface was also determined.

As can be seen it could be demonstrated that the compositions containing vinyl ethers showed improved properties as to geltimes, exothermal peaks, surface properties upon curing. Also conversion rate and rest enthalpy of the cured materials (both tested by Differential Scanning Calorimetry; DSC; explained below) were found to be better for the compositions according to the invention.

DSC Tests

The conversion of the cured material was tested on DSC, Mettler TOLEDO DSC 821, STAR system, via an isothermal cure of a known weight of sample at 25° C., followed by a dynamic run. The heating profile of the DSC was: 25° C. for 30 min., second run 25° C.–200° C. at 5° C./min.

Integration of the peaks gives the amount of energy (in mJoules); dividing this amount of energy by the original sample weight (in mg) yields the enthalpy (in Joules per gram).

The conversion rate (α) is given by the ratio of the partial and total heat of reaction:

$$\alpha = \Delta H_{T25}/\Delta H\infty$$

In the following table for Examples 2 and 3 (and Comparative Examples 2 and 3) abbreviations are being used as follows:

| | |
|---|---|
| HPMA | Hydroxypropylmethacrylate |
| HBUVE | Hydroxybutyl vinyl ether |
| BDDMA | Butanediol dimethacrylate |
| TGDVE | Triethyleneglycol divinylether |
| Luci 20 | Lucipal 20 ™, a product of AKZO Nobel which contains 20% dibenzoylperoxide in calcium carbonate |
| DIPPT | Di-isopropoxy para-toluidine |
| gel t*) | Interval 25–35° C.; in minutes |
| exth. t.**) | Interval 25–35° C.; exothermal time in minutes |
| exth. p.***) | Exothermal peak in ° C.; |
| α****) | Conversion ratio, as determined by DSC |
| surf. ass. | Assessment of surface (+++ versus + means that surface cure is much better than acceptable level +) | thermal peak, and the associated temperature level. The gel time was measured according to DIN 16945; at 25° C. in a thermostatted bath, statically and in a defined test tube. For the DSC-test and determination of the rest enthalpy (J/g) a slightly different method was used as compared to that indicated above, namely:

The conversion of the cured material was tested on DSC, Mettler TOLEDO DSC 821, STAR system. The samples used were casted between 1 mm rims and mylar foil and then cured with the same cure system as in the previous Examples. The heating profile of the DSC was: from 25° C.–200° C. at 20° C./min. Integration of the peaks gives the amount of energy (in mJoules); dividing this amount of energy by the original sample weight (in mg) yields the enthalpy (in Joules per gram). The rest enthalpy gives a precise indication of the degree of conversion.

In the following table for Examples 4.1 and 4.2 (and Comparative Examples 4A, 4B and 4C) the same abbreviations are being used as in the foregoing table. In addition, also PTBC (para-t-butyl catechol) is listed. Instead of the DSC conversion ratio (%), now the rest enthalpy is presented (J/g).

Table for Examples 2 and 3 (and Comparative Examples 2 and 3)

| | Comp. Ex. 2A | Comp. Ex. 2B | Ex. 2.1 | Ex. 2.2 | Ex. 3.1 | Ex. 3.2 | Comp. Ex. 3A | Comp. Ex. 3B |
|---|---|---|---|---|---|---|---|---|
| Resin B | 100 | 100 | 100 | 100 | 20 | 25 | 20 | 25 |
| HPMA | — | 10 | — | — | 30 | 35 | 50 | 35 |
| HBUVE | — | — | 10 | — | 20 | — | — | — |
| BDDMA | — | — | — | — | 30 | 10 | 30 | 40 |
| TGDVE | — | — | 10 | — | — | 30 | — | — |
| Luci 20 | 20 | 20 | 20 | 20 | 10 | 10 | 10 | 10 |
| DIPPT | | | | | 0.65 | 0.65 | 0.65 | 0.65 |
| gel t* | 4.9 | 5.6 | 4.5 | 5.5 | 4.2 | 4.2 | 4.8 | 5.1 |
| exth.t.** | 8.3 | 8.4 | 6.7 | 8.0 | 5.9 | 5.7 | 6.2 | 6.3 |
| exth.p.*** | 150 | 150 | 163 | 158 | 153 | 144 | 155 | 150 |
| α**** | n.d. | n.d. | n.d. | n.d. | 0.76 | 0.80 | 0.51 | 0.56 |
| surf.ass. | very wet | very wet | 50% dry | 30% dry | +++ | +++ | + | + |

EXAMPLES 4.1 AND 4.2 (AND COMPARATIVE EXAMPLES 4A, 4B, AND 4C).

These examples and comparative examples show the effects of use of vinyl ethers in combination with another resin, Diacryl 101™ (a bisphenol-A ethoxylated dimethacrylate, commercially available from AKZO), hereinafter referred to as Resin C. In particular, the resin compositions obtained according to the invention are very suitable for use in structural applications.

In this set of Examples and Comparative Examples molar amounts of components exchanged were kept the same (calculated as molar amounts of unsaturations).

A summary is given in the following table, the quality of the resin compositions having been assessed on the basis of the determination of the gel times or the times associated with the interval from 25° C. to the reaching of the exo- Table for Examples 4 (and Comparative Examples 4)

| | Comp. Ex. 4A | Ex. 4.1 | Comp. Ex. 4B | Ex. 4.2 | Comp. Ex. 4C |
|---|---|---|---|---|---|
| Resin C | 67 | 67 | 67 | 67 | 67 |
| HPMA | 33 | — | — | — | — |
| HBUVE | — | 33 | — | — | — |
| BDDMA | — | — | 33 | — | — |
| TGDVE | — | — | — | 33 | — |
| Styrene | — | — | — | — | 33 |
| Luci 20 | 10 | 10 | 10 | 10 | 10 |
| DIPPT | 0.65 | 0.65 | 0.65 | 0.65 | 0.65 |
| PTBC | 0.01 | 0.01 | 0.01 | 0.01 | 0.01 |
| gel t* | 9.0 | 3.5 | 14.8 | 9.8 | 14.7 |
| exth.t** | 10.3 | 4.9 | 16.5 | 11.3 | 17.3 |
| exth.p.*** | 142 | 128 | 138 | 130 | 158 |

-continued

|  | Comp. Ex. 4A | Ex. 4.1 | Comp. Ex. 4B | Ex. 4.2 | Comp. Ex. 4C |
|---|---|---|---|---|---|
| Rest enth [J/g] | 29.3 | 4.5 | 27.3 | 5.0 | 34.6 |

What is claimed is:

1. A curable resin composition effective for use as a molding or structural resin comprising an unsaturated prepolymer, a vinyl ether monomer that can be cross-linked with it and one or more other monomers, wherein the vinyl ether monomer is a vinyl ether having a general structure according to formula (I) or (II):

$$A-CH=CH-O-R \tag{I}$$

or $$(A-CH=CH-O)_n-R' \tag{II}$$

where

A represents hydrogen or an alkyl group with 1–3 C atoms, and where, if there is more than one A, the individual A groups may be the same or different, R either represents an aliphatic group, optionally branched, with 1–20 C atoms, which may also contain a cyclohexyl group and optionally in the carbon chain also one or more O and/or S atoms, which group may also be substituted with a functional group chosen from either a hydroxyl group or an amino group, optionally substituted with one or two alkyl groups with 1–3 C atoms, or represents a polyethylene glycol or a polypropylene glycol with an average chain length of 2 to 10 glycol units, optionally with an aliphatic group with 1–5 C atoms attached to the chain's free hydroxyl group, and R' either is a residual group that corresponds to an aliphatic group, optionally branched, with 2–20 C atoms, which may also contain a 1,4-dimethylenecyclohexyl group, or represents a polyethylene glycol or a polypropylene glycol with an average chain length of 2 to 10 glycol units, and n is 1, 2, 3, or 4, and where the unsaturated prepolymer has an average molecular weight from 250 to 5000 and is a (meth)acrylate-containing resin selected from the group consisting of vinyl esters resins and vinyl ester urethane resins obtained by reacting an isocyanate, a polyol and a hydroxyl-terminated ester of (meth)acrylic acid, and has an acid number of less than 10 mg of KOH per g, and where the curing may be effected with the aid of a radical-forming system that is unstable in the temperature range from −20° C. to +110° C.

2. Curable resin composition according to claim 1, wherein the vinyl ether monomer is a mono-and/or divinyl ether monomer.

3. Curable resin composition according to claim 2, wherein the vinyl ether monomer is butanediol divinyl ether, butyl vinyl ether, cyclohexanedimethanol divinyl ether, cyclohexanedimethanol monovinyl ether, diethylene glycol divinyl ether, ethylene glycol divinyl ether, 2-ethylhexyl divinyl ether, ethyl vinyl ether, hexanediol divinyl ether, hydroxybutyl vinyl ether, methyl vinyl ether, triethylene glycol divinyl ether, triethylene glycol methyl vinyl ether or trimethylolpropane trivinyl ether.

4. Curable resin composition according to claim 3, wherein the vinyl ether monomer is hydroxybutyl vinyl ether or triethylene glycol divinylether.

5. Curable resin composition according to claim 1, wherein the (meth)acrylate-containing resin is said vinyl ester urethane resin.

6. Curable resin composition according to claim 1, wherein the amount of vinyl ether monomer is 0.5–50 wt. %, relative to the weight of the total resin composition.

7. Curable resin composition according to claim 6, wherein the amount of vinyl ether monomer is 5–20 wt. %, relative to the weight of the total resin composition.

8. Process for the preparation of a curable resin composition effective for use as a molding or structural resin comprising an unsaturated prepolymer, a vinyl ether monomer that can be cross-linked with it and one or more other monomers, wherein the resin composition is prepared by blending (1) an unsaturated prepolymer having an average molecular weight from 250 to 5000 and which comprises a (meth)acrylate-containing resin selected from the group consisting of vinyl esters resins and vinyl ester urethane resins obtained by reacting an isocyanate, a polyol and a hydroxyl-terminated ester of (meth)acrylic acid, and having an acid number of less than 10mg of KOH per g, (2) a vinyl ether monomer having a general structure according to formula (I) or (II):

$$A-CH=CH-O-R \tag{I}$$

or $$(A-CH=CH-O)_n-R' \tag{II}$$

where

A represents hydrogen or an alkyl group with 1–3 C atoms, and where, if there is more than one A, the individual A groups may be the same or different, R either represents an aliphatic group, optionally branched, with 1–20 C atoms, which may also contain a cyclohexyl group and optionally in the carbon chain also one or more O and/or S atoms, which group may be substituted with a functional group chosen from either a hydroxyl group or an amino group, optionally substituted with one or two alkyl groups with 1–3 C atoms, or represents a polyethylene glycol or a polypropylene glycol with an average chain length of 2 to 10 glycol units, optionally with an aliphatic group with 1–5 C atoms attached to the chain's free hydroxyl group and R' either is a residual group that corresponds to an aliphatic group, optionally branched, with 2–20 C atoms, which may also contain a 1,4-dimethylenecyclohexyl group, or represents a polyethylene glycol or a polypropylene glycol with an average chain length of 2 to 10 glycol units and n is 1, 2, 3 or 4, (3) one or more other monomers (4) together with any fillers and/or additives that may be required, after which the resin composition can be cured by adding a radical-forming system that is unstable in the temperature range from −20° C. to +110° C.

9. Curable resin composition according to claim 1, wherein the (meth)acrylate-containing resin is said vinyl ester resin.

10. Curable resin composition according to claim 1, wherein the (meth)acrylate-containing resin further comprises an unsaturated polyester prepolymer.

11. Curable resin composition according to claim 1, further comprising a radical-forming system that is unstable in the temperature range from −20° C. to +110° C.

12. Method for production of a molded part or structural material, comprising curing the curable resin composition according to claim 1 to form a molded part or structural material having a thickness of at least 1 millimeter.

13. Method for production of a molded part or structural material according to claim 12, which comprising curing the curable resin composition in the presence of a radical-forming system which is unstable in the temperature range from −20° C. to +110° C.

14. Method for production of molded parts or structural materials according to claim 13, which comprises curing the curable resin composition in the presence of said radical-forming system and an accelerator.

15. Method for production of a molded part or structural material, comprising curing the curable resin composition obtained according to the process of claim 8 to form a molded part or structural material having a thickness of at least 1 millimeter.

16. Method for production of a molded part or structural material according to claim 15, which comprises curing the curable resin composition in the presence of a radical-forming system which is unstable in the temperature range from −20° C. to +110° C.

17. Method for production of molded parts or structural materials according to claim 16, which comprises curing the curable resin composition in the presence of said radical-forming system and an accelerator.

18. A cured resin composition obtained by curing the curable resin composition according to claim 1.

19. Flooring material comprising the cured resin composition according to claim 18, and having a thickness of at least 1 millimeter.

20. Roofing material comprising the cured resin composition according to claim 18, and having a thickness of at least 1 millimeter.

21. A rock bolt comprising the cured resin composition according to claim 18, and having a thickness of at least 1 millimeter.

* * * * *